United States Patent [19]
Wood

[11] 3,923,537
[45] Dec. 2, 1975

[54] COLD ASPHALT BINDER AND PAVING PROCESS

[75] Inventor: Jack E. Wood, Upland, Calif.

[73] Assignee: Bray Oil Company, Los Angeles, Calif.

[22] Filed: Apr. 28, 1972

[21] Appl. No.: 248,580

[52] U.S. Cl. ............... 106/277; 106/278; 106/279; 106/280; 106/283
[51] Int. Cl.² ................... C08L 95/00; C09D 3/24
[58] Field of Search ................ 106/277–280, 106/283

[56] References Cited
UNITED STATES PATENTS

| | | | |
|---|---|---|---|
| 2,349,446 | 5/1944 | McGrane | 106/280 |
| 2,909,441 | 10/1959 | Pickell | 106/273 X |
| 3,093,500 | 6/1963 | Jones | 106/273 |
| 3,418,249 | 12/1968 | Pitchford | 106/277 X |
| 3,434,856 | 3/1969 | Goldstein | 106/277 |

OTHER PUBLICATIONS

Abraham, Asphalts and Allied Substances, 6th Ed., Vol. 3, D. Van Nostrand Co., Inc., N.Y., (pp. 5–11, "Softening the Substance and Lowering its Fusing-Point"). TN 853 A 35, 1960.

*Primary Examiner*—Joseph L. Schofer
*Assistant Examiner*—Herbert J. Lilling
*Attorney, Agent, or Firm*—Vanderveer Voorhees; Thomas A. Schenach

[57] ABSTRACT

Powdered high melt asphalt, e.g. 250°–340° softening point, is suspended in water with a dispersant and the liquid is mixed with aggregate and a flux oil which unites with the asphalt when the mixture is compacted as on a pavement, forming a strong binder for the stone.

3 Claims, 1 Drawing Figure

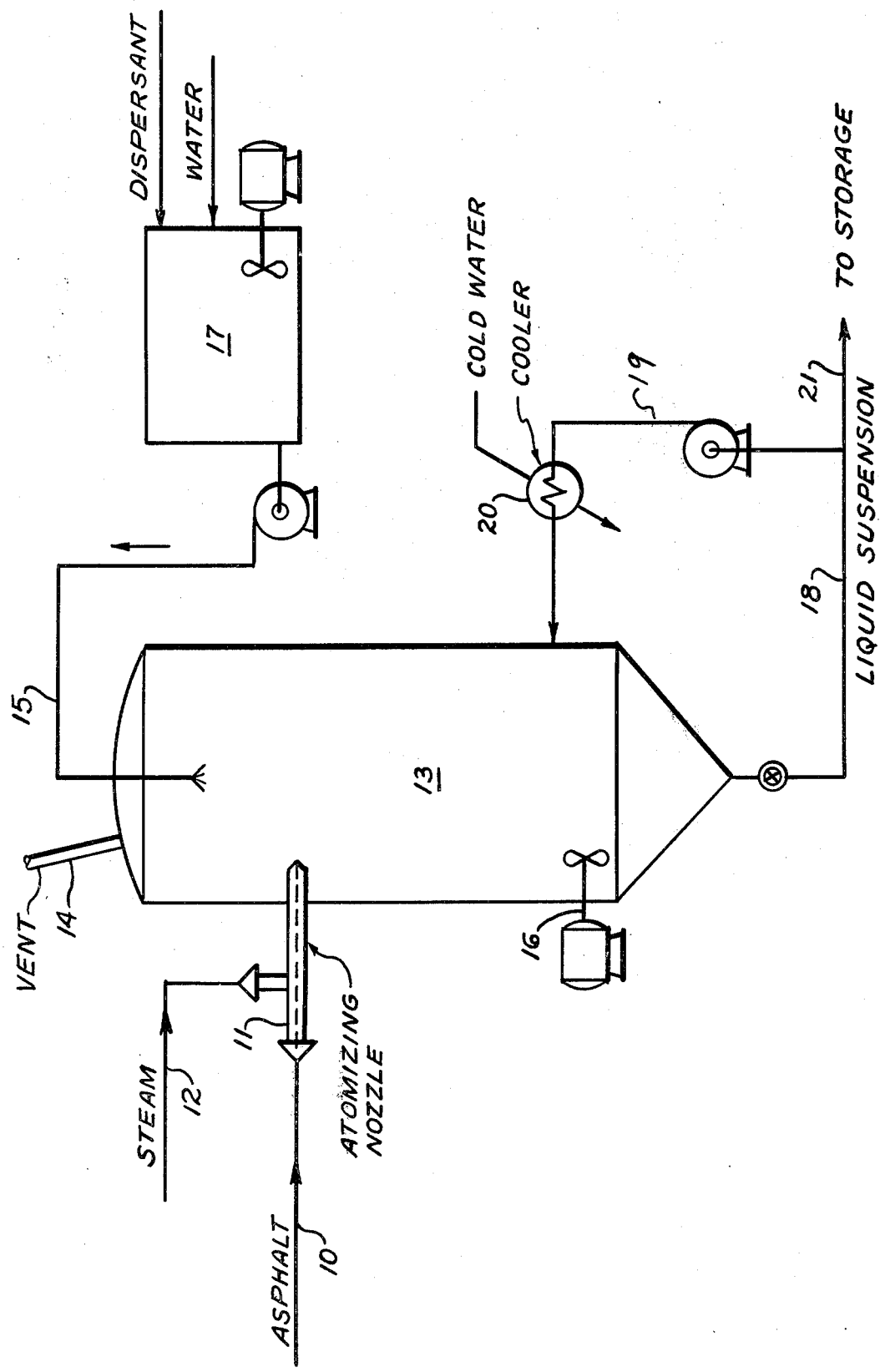

COLD ASPHALT BINDER AND PAVING PROCESS

This invention relates to asphalt pavements and a novel method of constructing them. More particularly, it relates to an improvement in the so-called cold mix process wherein a powdered, high melt asphalt is combined with a residual oil or "flux oil" in the presence of stone aggregate to produce the required binder for the stone. Such processes are well known and are described in my U.S. Pat. No. 3,418,900 and others such as: 2,783,163 and 3,074,807.

Although this process has met with considerable favor, especially in patching operations where it is not practical to use hot mix, one difficulty inherent in the process is the need for handling and transporting asphalt in the form of powder where dusting and atmospheric contamination are objectionalble. Attempts have been made to avoid this by grinding the asphalt at the point of use, but this is not always practical.

I have now discovered a method of handling the asphalt powder in the form of a liquid suspension in water which completely surmounts the above disadvantages of handling the black powder. My method will be described more fully hereinafter. I have also devised a method of making the liquid asphalt suspension without the necessity of grinding the hard asphalt. This method is illustrated by a drawing which shows schematically an apparatus for the purpose.

The liquid suspension of my process must not be confused with the emulsified asphalt commonly used in the paving industry. Such emulsions have very much finer particles of the order of a few microns diameter dispersed in water in the form of a thin liquid somewhat resembling milk. When applied to stone aggregate, the emulsion "breaks", releasing the asphalt as a sticky, adherent binder for the stone. My suspended asphalt powder, on the other hand, has no binding character whatever, per se. When the water evaporates from it, it reverts to powder which can be dusted from the surface. The particles are vastly larger than those in asphalt emulsions as shown by the following dry screen test on a sample of pulverized gilsonite:

99% through 10 mesh
94% through 20 mesh
68% through 50 mesh
41% through 100 mesh
31% through 150 mesh
17% through 200 mesh Hard asphalt suitable for my process will have a softening point, ball and ring, of about 250° to 300°F. and even up to 340°F. Natural asphalt such as Gilsonite can be used as well as hard blown asphalts from petroleum residuum. When the latter are employed, the liquid asphalt from the blowing operation can be atomized without the necessity of cooling and milling. When milling the hard asphalt, it can be ground with the water and dispersant used to suspend it, thereby avoiding any problem with dust which is encountered in the usual hammer mill operation. Wet milling can be done in a ball mill, a paint mill, a "koller gang" or a variety of different mills to which the asphalt is charged in lump with the required amount of water. Such mills are often equipped with screens through which the product flows when reduced to the required particle size, 80 to 150 mesh for example.

Referring to the drawing which shows an atomizing method of producing the asphalt suspension, hot melted asphalt direct from the air blowing operation or from a melting pot at about 400°–600°F. is charged by line 10 to atomizing nozzle 11 where it is atomized by a current of steam or inert gas introduced under a pressure of about 50 to 500 psi by line 12. Nitrogen gas can be used and recycled from drum 13 and vent 14. Oxygen must be avoided because of the danger of explosion. The atomized asphalt entering drum 13 is instantly solidified by a cold water spray from line 15, forming a slurry which falls to the lower section of drum 13. Slurry accumulating in 13 is kept agitated by stir 16. The required amount of dispersant is mixed with water in tank 17.

It is desirable to hold the temperature of the slurry below about 200°F., generally between 100° and 150°F. for convenience in handling. This is done by recycling the slurry through lines 18 and 19 through cooler 20. Product is removed continuously or intermittently through line 21.

A wide variety of substances can be used as dispersants with varying effectiveness. Excellent dispersants are made from pulp wood liquor such as "Marasperse" made by the Marathon Paper Company, and "Lignosite" made by the Georgia-Pacific Company. A concentration of 1% in the water phase is effective and ½–3% will usually suffice. The "Tergitols" made by Carbide and Carbon Company and the polyglycol derivatives of nonyl phenol are good. One of the latter is marketed by Monsanto under the name of "Poly-Tergent B-300". Other dispersing agents are the water soluble petroleum sulfonates typified by the "green acid" soaps; the petroleum naphthenates; fatty acid soaps such as sodium pelargonate, oleate, recinoleate and the like; sodium silicate; the colloidal clays such as bentonite and montenorillonite; the vegetable gums and starches such as guar gum; the polyglycols and their derivatives; esters with fatty acids, etc.; sodium alginate; and glycerol monoleate.

When the dispersant is dissolved in water and agitated rapidly, the asphalt powder is added gradually until the desired ratio of asphalt to water is reached, e.g. 50–60% by weight. The product should be a smooth flowing liquid easily pumpable. At a concentration of 50%, each gallon will contain about four pounds of hard asphalt. Lower and higher concentrations can be made such as 40 to 65% solids, although generally more dispersant will be required when the asphalt content is above 50%. When using pulp liquor products, it is helpful to add a small amount of electrolyte such as 0.2% calcium chloride. Combinations of two or more dispersants such as the green acid sulfonates from petroleum refining and the calcium lignosulfonic acids are quite effective.

The ratio of hard asphalt powder to flux oil in the paving mix is about 1 to 4 down to 1 to 10, a common ratio being 1:5 to 1:8. Lighter viscosity flux oils, of course, will require more hard asphalt. A typical mix will be 1 gallon of liquid suspension (powder) to 2-½ gallons of S.C. flux.

Typical flux oils have the following characteristics:

|  | S.C. 250 | R.C. 800 |
| --- | --- | --- |
| Flash, Closed Cup, °F. | 295 | 152 |
| Kinematic Viscosity, 140°F. cs. | 456 | 950 |
| Gravity, API | 14 | 13 |
| Total Distillate at 680°F., % | 5.5 | 15.5 |
| Water | Nil | Nil |
| Ductility at 77°F., 5 cm./min. | 110+ | 110+ |
| Solubility in CCl₄, % | 99.9 | 99.9 |

| | S.C. 250 | R.C. 800 |
|---|---|---|
| Penetration at 77°F., 100 gm-5 sec. | — | 105 |

Mixing plants equipped to heat the stone aggregate can optionally mix slurry with stone at ambient temperature or heated, for example to 150°–200°F. The liquid suspension can be pumped directly into the stone while mixing, in a pug mill for example, and the water phase expelled by evaporation, if hot, leaving a uniform coating of asphalt powder on the stone. Then the flux oil is added and mixing continued for a minute or two. When cold stone is used, the water contained in the suspension — a fraction of 1% — is evaporated from the paving mix when laid in place and rolled.

With my novel powder suspension, I can package both the suspension and the required amount of flux oil together without deterioration or amalgamation taking place over a long period of time, owing to the fact that each particle of hard asphalt is surrounded by a film of water which repels contact with the flux oil phase. The flux oil can be emulsified with water and soap before combining with the asphalt suspension. The combination, after mixing with stone and evaporation of water, becomes a unified strong asphalt binder for the rock. By supplying the combined mix in this way, the user is relieved of having to measure the ingredients to obtain the correct ratio of hard asphalt to flux. The low volatility of the flux oil, as indicated by the flash point of upwards of 150°F., is a factor in preventing amalgamation of the oil and asphalt in the dispersion.

EXAMPLE 1

To 100 grams of water in a turbine mixer was added 1 gram of "Poly-Tergent B-300". To the solution was added gradually 100 grams of powdered hard asphalt. After about one minute of mixing, the material became a smooth flowing liquid. When 25 grams more asphalt was added, the mixture stiffened to a thin paste, but became liquid again on adding 1 gram more of the dispersant.

EXAMPLE 2

To 100 cc. water in a mixer was added 1 gram powdered "Lignosite" of Georgia-Pacific Company. To the solution was added 100 grams powdered hard asphalt. A doughy paste resulted which instantly liquefied when 1 cc. of $CaCl_2$ solution — 20% — was added. The suspension showed no sign of separating on standing in a bottle for many days.

EXAMPLE 3

A typical paving formula for a 1 ton batch using powdered asphalt is as follows:

| Fines (resembling sand) | 300 lbs. |
|---|---|
| Stone — ¼ inch | 733 lbs. |
| Stone — ⅜ inch | 862 lbs. |
| Flux Oil No. 250 | 100 lbs. |
| Powdered Asphalt | 12.5 lbs. |

Based on this formula, a batch of 120 pounds was prepared with powdered asphalt slurry containing 55% asphalt by weight. The powder contained in this slurry was coarsely ground, 50% failing to pass a screen of 60 mesh and only 20% passing 100 mesh. It was held in suspension by 2% of "Lignosite" and the addition of salt — NaCl — sufficient to adjust the density of the water phase to match that of the asphalt. About ½ percent of carboxy methyl cellulose was also added to increase the viscosity of the aqueous phase. In a 3 gallon batch containing about 1-½ gallons of water, the amount of salt added was 570 grams, equal to about 10% of the aqueous phase.

| 120 Pound Batch of Paving Material | |
|---|---|
| Fines | 18 lbs. |
| Stone — ¼ inch | 44 lbs. |
| Stone — ⅜ inch | 52 lbs. |
| Flux S.C. | 6 lbs. |
| Powdered Asphalt Slurry | 1.35 lbs. |

The aggregate was added to a cement mixer of the revolving barrel type and thoroughly mixed. The flux oil was then added to coat the stone, then the slurry was added and thoroughly mixed. The product was then placed in a depression of an existing asphalt paved roadway where it would get a maximum amount of traffic. It was rolled into place with a small one ton road roller. After three days, it was still slightly "springy", but, after a week, it had set to a hard, strong mass as the water evaporated and the powder became amalgamated with the flux oil. Possibly the mass would harden faster if the slurry were added to the stone before adding flux oil.

One of the valuable characteristics of my slurry asphalt process is the long stockpile life attainable after mixing with the aggregate. The aqueous phase surrounding the hard asphalt particles delays amalgamation with flux oil until compacted on the road where the water is rapidly evaporated. For repair work, it is very convenient to stockpile the mix for weeks and draw on it from time to time as needed for repair jobs such as filling chuck holes, forming berms or curbs, etc.

Although I have described my invention with respect to certain examples, I do not intend it to be limited thereby. Thus, I can employ other dispersing agents and suspending agents than those mentioned. For example, I may add bentonite clay to the powdered asphalt suspension, or sodium silicate, etc., to stabilize it. Asbestos fines can be incorporated in the suspension to add strength and crack resistance to the final pavement. Also, I can use calcium chloride, barium or magnesium chloride to adjust the density of the aqueous phase to equal the density of the powdered asphalt, usually 1.02 to 1.1. A sodium chloride solution of 5 to 10 percent is usually effective. In some cases, seawater can be used and natural brines from seawater or other source can be used.

Having thus described my invention, what I claim is:

1. A stable liquid composition suitable for binding stone aggregate comprising (A) a suspension in water of powdered hard asphalt, softening point above about 250°F., having a particle size lying predominantly in the range of 10 to 200 mesh stabilized with a water soluble dispersant and (B) a flux oil of the character used in paving mixtures, the ratio of asphalt to flux oil in the composition being about 1:4 to 1:10.

2. The composition of claim 1 wherein the flux oil is emulsified in water as an oil-in-water emulsion before mixing with said asphalt suspension.

3. The composition of claim 2 wherein the said suspension of hard asphalt of softening point above about 250°F. is made by atomizing a melt thereof into a suspending zone wherein particles of said melt are congealed and suspended in a spray of water containing said water soluble dispersant.

* * * * *